United States Patent Office 2,825,213
Patented Mar. 4, 1958

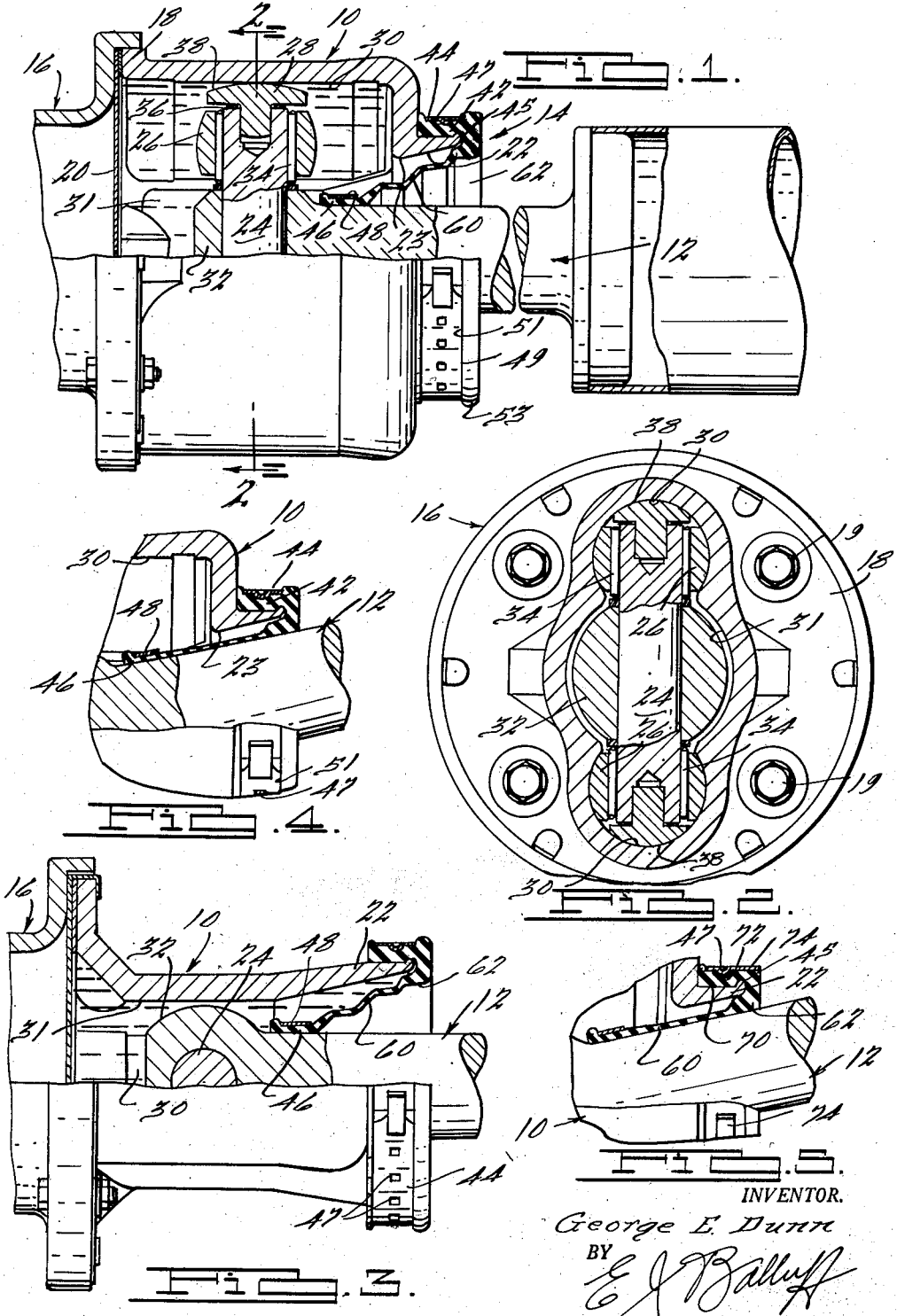

2,825,213

UNIVERSAL JOINT AND BOOT

George E. Dunn, Dearborn, Mich., assignor, by mesne assignments, to Chrysler Corporation, Detroit, Mich., a corporation of Delaware Application February 4, 1955, Serial No. 486,208

4 Claims. (Cl. 64—32)

This invention relates to universal joints and has particular reference to certain new and useful improvements in joints of the type shown in Warner U. S. Letters Patent No. 1,921,274.

Joints of the type to which this invention relates are extensively used in the drive systems of automotive vehicles, particularly those employing the Hotchkiss type of drive. The problem of sealing this type of joint so as to seal the lubricant therein and to exclude dirt therefrom has always been difficult, and while numerous efforts have been made in this respect, the problem has continued to be a serious one.

Boots of the type shown in Hagerty U. S. Letters Patent No. 2,308,073 have proven to be the best solution for sealing these joints up to the present time, and millions of such Hagerty boots have been and are being used. However, Hagerty type boots are subject to injury as they are exposed to some extent beneath the car, and in addition they are subject to distention and rupture under the influence of centrifugal force, especially when lubricant from within the joint body escapes into the boot. Even if the boot does not rupture under such conditions, the escape of lubricant from within the joint body may leave the working parts of the joint without adequate lubrication, and in addition lubricant within the boot has a tendency to collect on one side thereof, thereby unbalancing the joint and shaft assembly and causing undesirable vibration.

The present invention contemplates a universal joint assembly in which the boot thereof is constructed and arranged so as to minimize if not substantially eliminate the foregoing difficulties.

A principal object of the invention, therefore, is to provide a new and improved universal joint.

Another object of the invention is to provide a new and improved universal joint of the sliding two-trunnion type.

Another object of the invention is to provide a new and improved universal joint boot.

Another object of the invention is to provide a joint of the character described in which the boot is constructed and arranged so as to be largely confined within the body of the joint.

Other and further objects of the invention will be apparent from the following description and claims and may be understood by reference to the accompanying drawings, of which there is one sheet, which by way of illustration show preferred embodiments of the invention and what I now consider to be the best mode in which I have contemplated applying the principles of my invention. Other embodiments of the invention may be used without departing from the scope of the present invention as set forth in the appended claims.

In the drawings:

Fig. 1 is a side elevational view, partly in section, of a part of a joint assembly embodying my invention;

Fig. 2 is a cross sectional view taken along line 2—2 of Fig. 1;

Fig. 3 is a top plan view of Fig. 1, partially in section;

Fig. 4 is a fragmentary sectional view similar to Fig. 1 and showing the relation of the joint body, boot and shaft, with the shaft approaching its maximum angular displacement from the axis of the joint body; and Fig. 5 is a view similar to Fig. 4 and illustrating a modified arrangement.

As illustrated, a joint embodying my invention comprises in general a hollow body 10, a shaft 12, a boot 14, and a companion flange 16 which is secured and affixed to the flange 18 of the body 10 by bolts 19 which extend through aligned openings in the companion flange 16 and the flange 18. The body is adapted to contain lubricant and for this purpose one end of the body 10 is closed by a grease cover 20 which is clamped between the companion flange 16 and the body flange 18. The other end of the body is formed to provide an integral frusto-conical, axially projecting neck 22 which surrounds and flares outwardly away from a restricted axial opening 23 into the body through which one end of the rotary shaft 12 projects. The cross sectional area of such body opening 23 and the inside of the neck 22 is materially greater than the cross section of said shaft 12 so as to permit universal movement between said shaft and body.

Means are arranged within the body 10 to provide a rotary universal driving connection and for telescoping movement between the body 10 and the shaft 12, and as illustrated, such means comprise a pin 24, a pair of balls 26, centering buttons 28, and cylindrical guides 30 disposed on opposite sides of a center bore 31. The end 32 of the shaft 12 forms a ballhead which is provided with a bore in which the pin 24 is secured, the ends of the pin forming trunnions on which the balls 26 are journaled by means of needle roller bearings 34. The centering buttons are slidably mounted on the ends of the pin 24, and a spring 36 is confined between the underside of each button 28 and the adjacent end of the pin 24. The centering buttons 28 have their outer surfaces 38 formed with a double curvature. In the plane of Fig. 2, the surfaces 38 have a curvature which corresponds with that of the cylindrical guides 30, while in the plane of Fig. 1 the surfaces 38 are curved about the center of the pin 24.

The pin 24 is arranged so that its center, which lies midway between its ends on the axis thereof, will be disposed on the axis of the shaft 12, and the centering button arrangement as illustrated is designed to center the body 10 with respect to the shaft 12 so that when the axes of the shaft 12 and the body 10 are out of alignment, as illustrated in Figs. 4 and 5, such axes will intersect at the center of the pin referred to and so that when the body 10 and the shaft 12 are in alignment their axes will coincide. Such means for providing a universal rotary driving and telescoping connection between the body and the shaft is the type of construction disclosed in the aforesaid Warner patent.

The end 32 of the shaft 12 is disposed within the center bore 31 of the body 10, the center bore intersecting the guides 30. At the end of the body 10 closed by the grease cover 20, the guides 30 and the bore 31 are open, while at the other end the guides are closed while the bore 31 opens through the opening 23 into the frusto-conical opening defined by the neck 22.

The boot 14 is annular in cross section and is formed of flexible elastic rubber-like material, such as rubber or synthetic rubber, and is substantially wholly disposed within the body 10 as illustrated. The large end of the boot is formed with an an integral collar 42 which fits over the outer end and is seated upon the outer periphery of the neck 22 and fixed in sealing relation thereto by means of a metal clamping band 44 which is disposed around the outside of the collar 42 and adjacent the outer end of the neck 22. The outer end of the neck 22 is provided with a bead 45 which fits within a groove in the collar 42 for locating purposes. The clamping band 44 is provided with a series of inwardly extending projections 47 which project into the material of the collar 42 so as to restrain the collar from pulling out from under the band 44. The collar 42 is also formed with a peripheral groove or channel in which the clamping band 44 is seated. It will be observed that the right-hand edge 49 of the clamping band 44 (Fig. 1) extends almost to the outer end of the neck and surrounds the bead 45 and abuts the side surface 51 of a rib 53 so as to restrain that part of the boot disposed axially beyond the bead 45 from deflection under the action of centrifugal force.

The small end of the boot 14 is formed as a cylindrical collar 46 which is formed to fit around and for sealing attachment on the shaft 12 within the body 10. A metal band 48 similar to the band 44 is employed for clamping and fixing the collar 46 in sealing relation with the shaft 12. The bands 44 and 48 fixedly clamp the collars 42 and 46 to their respective parts so as to seal one end of the boot to the shaft 12 and the other end of the boot to the body 10 so that when the boot is thus secured it provides a flexible elastic seal between the body 10 and the shaft 12 impervious to dirt and moisture, and such boot functions to seal lubricant within the body 10.

The boot 14 includes a flexible elastic part 60 which extends between and connects the collars 42 and 46 and which is disposed wholly within the body as illustrated. Such part 60 is constructed so as to be readily flexible and stretchable to accommodate the telescoping action and the universal movement between the shaft and the body, and the neck 22 serves to shield such part and to limit the deflection thereof under the action of centrifugal force. As illustrated, this part is convoluted to better accommodate the elongation and the flexing thereof during telescoping movement of the body 10 relative to the shaft 12.

The collars 42 and 46 are made relatively heavy as compared with the convoluted part 60. The frusto-conical inner surface of the neck 22 preferably should be relatively smooth so as to minimize abrasion of the boot. However, the inner surface of the neck 22 will be lubricated.

The enlarged end of the boot adjacent the end of the neck 22 is formed to provide an annular bumper 62 within the neck adjacent the outer end thereof. The bumper 62 is disposed between the neck and the shaft so as to restrain the shaft 12 from pinching the relatively thin part 60 between the shaft and the neck.

The arrangement illustrated in Fig. 5 is essentially the same as that just described except that the collar 70 is provided with a relatively small annular groove 72 for locating the projections 47 of the clamping band 74. In this case the collar need not be made with a groove to seat the clamping band, as shown in Fig. 1, and the clamping band 74 is wide enough so as to overlie that part of the boot which is disposed axially beyond the end of the neck 22 so as to restrain such part from deflection under the action of centrifugal force. When the boot collar 70 is compressed by and under the clamping band 74, the projections 47 of the clamping band preferably should project into the material of the collar 70 inwardly beyond the outside diameter of the neck bead 45 so as to prevent the boot from pulling off the neck 22. The parts may otherwise be the same as illustrated in Figs. 1–4.

Since the boot is protected by the body, it will not be subjected to damage due to materials thrown up from the road, as may occur in the case of the present type of boots. In addition, since the body surrounds the boot 14, the distortion thereof under centrifugal force will be limited, and since the end of the boot secured to the shaft is disposed within the body, with the arrangement shown the boot will be subjected to less stress for a given angularity than is true for conventional boots. Furthermore, the boot arrangement shown positively confines and seals lubricant within the joint body where it is required. The construction illustrated thus provides an improved joint, and since the boot embodying my invention requires substantially less material than conventional boots, a saving in the cost of manufacture is possible.

This application is a continuation-in-part of my prior co-pending application Serial No. 403,559, filed January 12, 1954, for "Universal Joint," now abandoned.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A universal joint including a hollow body adapted to contain lubricant and having an integral frusto-conical, axially projecting neck at one end of said body which surrounds and flares outwardly away from a restricted axial opening into said body, a rotary shaft projecting into said body through said neck and opening, the cross sectional area of said opening and inside of said neck being materially greater than the cross section of said shaft so as to permit universal movement between said shaft and body, means within said body and carried by said shaft and cooperating with said body to provide a universal rotary driving and telescoping connection between said body and shaft and to center said body and shaft relative to each other in all working positions thereof, lubricant within said body for lubricating the working parts contained therein, and a frusto-conical boot of flexible elastic rubber-like material disposed around said shaft, clamping means securing the large end of said boot in fixed sealing relation with the outer end of said neck, clamping means securing the small end of said boot in fixed sealing relation with said shaft within said body, said boot when thus secured to said shaft and body providing a flexible, elastic seal therebetween impervious to moisture and dirt and functioning to sail said lubricant within said body, said boot being substantially wholly disposed within said body and being convoluted between its ends, said neck being disposed so as to shield the convoluted part of said boot and to limit the deflection thereof under the action of centrifugal force, said boot being provided with an annular bumper within said neck adjacent the outer end thereof, said bumper being disposed between said neck and said shaft so as to restrain said shaft from pinching said convoluted part between said shaft and said neck.

2. A universal joint including a hollow body adapted to contain lubricant and having an integral frusto-conical, axially projecting neck at one end of said body which surrounds and flares outwardly away from a restricted axial opening into said body so that the inside diameter at the outer end of said neck is materially greater than the diameter of said axial opening, a rotary shaft projecting freely into said body through said neck and opening, the cross sectional area of said opening and inside of said neck being materially greater than the cross section of said shaft so as to permit universal movement between said shaft and body, means within said body and carried by said shaft and cooperating with said body to provide a universal rotary driving and telescoping connection between said body and shaft and to center said body and shaft relative to each other in all working positions thereof, lubricant within said body for lubricating the working parts contained therein, a frusto-conical boot formed wholly of flexible elastic rubber-like material having an integral, relatively heavy collar at the large end thereof fitted over and around the outer end of said neck and an integral collar at the small end thereof fixed around said shaft, said collars both projecting in the same direction, clamping means securing said collar at the large end of said boot in fixed sealing relation with the outer end of said neck, clamping means on the body side of the boot securing said collar at the small end of said boot in fixed sealing relation with said shaft within said body, said boot when thus secured to said shaft and body providing a flexible, elastic seal therebetween impervious to moisture and dirt and functioning to seal said lubricant within said body, said boot being substantially wholly disposed within said body and being convoluted between said collars, said convoluted part of said boot having a wall of such thinness and of such flexibility that it is free to twist, flex, and stretch to accommodate the universal and telescoping action between said body and shaft, such convoluted part being subject to distension in use under the influence of centrifugal force, said neck being disposed so as to shield the convoluted part of said boot and to limit the distension thereof under the action of centrifugal force, said collar at the large end of said boot including a relatively thick, annularly extending portion which projects inwardly across the outer end of said neck and into said neck opening and which cooperates with said first-mentioned clamping means and said neck for restraining displacement of such convoluted part from said neck under the action of centrifugal force.

3. A universal joint according to claim 2 wherein said means which provides a universal rotary driving and telescoping connection between said body and shaft and which centers said body and shaft relative to each other comprises a pair of cylindrical guides in said body disposed on opposite sides of said shaft, a pair of axially aligned trunnions within said body and fixed on said shaft, one of said trunnions extending into each of said guides, and a ball journalled on each trunnion and a centering button carried by each trunnion, said balls and centering buttons being disposed in said guides and cooperating therewith to center said body and shaft relative to each other in all working positions thereof.

4. A universal joint boot formed entirely of flexible, elastic, rubber-like material and comprising a hollow frusto-conical section provided with an integral cylindrical collar at its smaller end forming a means by which such end of the boot can be attached and sealed to a part of a universal joint, said section at its larger end being provided with an integral, relatively heavy, cylindrical collar forming a means by which the larger end of the boot can be attached and sealed to another part of a universal joint, said frusto-conical section being convoluted between such collars to facilitate elongation and contraction thereof and the outside of said frusto-conical section forming the sealed-in side of the boot, said attaching collar at the larger end thereof being disposed in surrounding relation to said frusto-conical section and both of said collars projecting in the same direction, said boot being constructed so that in any cross section normal to the longitudinal axis thereof it is symmetrical, the convoluted portion of said boot having a wall of such thinness that it is free to twist, flex, and stretch to accommodate the flexing and stretching to which said boot is subjected in use on a universal joint and such that such convoluted part, unless confined, will distend in use under the influence of centrifugal force, said collar at the large end of said boot including a relatively thick, annularly and inwardly extending portion which is adapted to aid in restraining displacement of the convoluted part of the boot in use under the action of centrifugal force and which forms a bumper for protecting said convoluted part in use.

References Cited in the file of this patent
UNITED STATES PATENTS

| | | |
|---|---|---|
| 1,922,431 | Geyer | Aug. 15, 1933 |
| 2,308,073 | Hagerty | Jan. 12, 1943 |
| 2,323,569 | Rzeppa | July 6, 1943 |
| 2,426,701 | Miller, Jr. | Sept. 2, 1947 |
| 2,510,362 | Anderson | June 6, 1950 |